United States Patent [19]

Takemoto et al.

[11] Patent Number: 6,004,370
[45] Date of Patent: Dec. 21, 1999

[54] SINTERED FRICTION MATERIAL

[75] Inventors: Takatoshi Takemoto; Yukinori Yamashita, both of Itami, Japan

[73] Assignee: Sumitomo Electric Industries, Ltd., Osaka, Japan

[21] Appl. No.: 09/144,113

[22] Filed: Aug. 31, 1998

[30] Foreign Application Priority Data

| Sep. 4, 1997 | [JP] | Japan | 9-257860 |
| Nov. 19, 1997 | [JP] | Japan | 9-336332 |
| Nov. 19, 1997 | [JP] | Japan | 9-336333 |
| Nov. 19, 1997 | [JP] | Japan | 9-336334 |
| Nov. 26, 1997 | [JP] | Japan | 9-342206 |

[51] Int. Cl.$^6$ ..................................................... C22C 1/09
[52] U.S. Cl. .............................. 75/233; 75/234; 75/235; 75/247; 75/229
[58] Field of Search ............................. 75/233, 235, 243, 75/247, 252, 229, 234

[56] References Cited

U.S. PATENT DOCUMENTS 2,948,955  8/1960  Allen et al. .

FOREIGN PATENT DOCUMENTS

| 0316987 | 5/1989 | European Pat. Off. . |
| 57-085876 | 5/1982 | Japan . |
| 61-096226 | 5/1986 | Japan . |
| 63-280936 | 11/1988 | Japan . |
| 05032956 | 2/1993 | Japan . |
| 05247443 | 9/1993 | Japan . |

*Primary Examiner*—Ngoclan Mai
*Attorney, Agent, or Firm*—W. F. Fasse; W. G. Fasse

[57] ABSTRACT

A sintered friction material especially suitable for use in a braking system has a matrix of a copper-system metal such as copper, tin, nickel and aluminum, and contains a specific additive, graphite and potassium titanate as friction conditioners. The specific additive consists of at least one material selected from a group consisting of zirconium oxide, silica, dolomite, orthoclase and magnesium oxide. The specific additive, the graphite and the potassium titanate are preferably blended in volume ratios of 1 to 15%, 10 to 50% and 5 to 30% respectively. The form of the potassium titanate is at least one of whiskery, platy and spherical forms and preferably plate-like or spherical. The sintered friction material has good abrasion resistance, low abrasion of the counterpart, a high friction coefficient, excellent material strength, good chattering resistance, and good squealing resistance.

20 Claims, No Drawings

SINTERED FRICTION MATERIAL

BACKGROUND OF THE INVENTION

1. Field of the Invention

The present invention relates to a friction material, and more particularly, it relates to a friction material which is optimum for a sliding surface of a brake lining, a disc pad, a clutch facing or the like in a braking system of an automobile, rolling stock, an aircraft, an industrial machine or the like.

2. Description of the Prior Art

A friction material prepared by dispersing a base material in a binder of resin such as phenolic resin or epoxy resin, adding a friction conditioner as needed and binding and molding the mixture under heat and pressure is known for use as a friction material in the aforementioned braking system.

The friction coefficient of such a friction material is generally reduced as the temperature is increased. When an automobile continuously goes down descents or the like, therefore, the braking performance is remarkably reduced through so-called fading as the friction material becomes frictionally heated. To this end, a friction material employed under a high load condition is prepared from a sintered alloy based on a metal such as copper with addition of a friction conditioner such as graphite or ceramics in recent years.

However, some conventional friction material of a sintered alloy (hereinafter referred to as a sintered friction material) is insufficient in lubricity and remarkably abrades the counterpart although the friction material itself is less abraded. Another conventional friction material is remarkably abraded itself, although it abrades the counterpart to a larger degree. Thus, these conventional sintered friction materials have unsatisfactory characteristics under the present circumstances.

Still another conventional sintered friction material is insufficient in lubricity and remarkably abrades the counterpart although it exhibits a high friction coefficient. A further friction material is remarkably reduced in friction coefficient although it abrades the counterpart to a larger degree. Thus, these conventional sintered friction materials have unsatisfactory characteristics under the present circumstances.

A further conventional sintered friction material is insufficient in material strength although the same exhibits a high friction coefficient. A further friction material is remarkably reduced in friction coefficient although the same is sufficient in material strength. Thus, these conventional sintered friction materials have unsatisfactory characteristics under the present circumstances.

A further conventional sintered friction material is insufficient in judder resistance or chatter resistance although the friction material itself is less abraded. A further friction material is remarkably abraded itself although the same is sufficient in judder resistance. Thus, these conventional sintered friction materials have unsatisfactory characteristics under the present circumstances.

A further conventional sintered friction material is insufficient in creak resistance or squealing resistance although the same exhibits a high friction coefficient. A further friction material is remarkably reduced in friction coefficient although the same is sufficient in creak resistance. Thus, these conventional sintered friction materials have unsatisfactory characteristics under the present circumstances.

SUMMARY OF THE INVENTION

An object of the present invention is to provide a sintered friction material compatibly improving its abrasion resistance and suppressing abrasion of the counterpart.

Another object of the present invention is to provide a sintered friction material compatibly attaining a high friction coefficient and suppressing abrasion of the counterpart.

Still another object of the present invention is to provide a sintered friction material compatibly attaining both a high friction coefficient and excellent material strength.

A further object of the present invention is to provide a sintered friction material compatibly attaining both abrasion resistance and judder resistance.

A further object of the present invention is to provide a sintered friction material compatibly attaining both a high friction coefficient and excellent creak resistance.

The sintered friction material according to the present invention has a matrix of a copper-system metal and contains a specific additive, graphite and potassium titanate as friction conditioners, while the specific additive consists of at least one material selected from a group consisting of zirconium oxide, silica, dolomite, orthoclase and magnesium oxide.

The matrix of a copper-system metal, having excellent expandability and high hot conductivity, can stabilize the friction coefficient and disperse heat spots, while improving the friction coefficient through adhesion to the counterpart. The graphite improves the abrasion resistance of the friction material, while the potassium titanate suppresses adhesion to the counterpart for inhibiting abrasion of the counterpart and matches with the matrix material for maintaining the material strength.

When prepared from any of zirconium oxide, silica and dolomite ($CaCO_3 \cdot MgCO_3$), the specific additive improves the frictional force by removing an oxide film or the like adhering to the surface of the counterpart. When prepared from orthoclase $K_2O \cdot Al_2O_3 \cdot 6SiO_2$), the specific additive has proper hardness and small attackability to the counterpart, and improves the judder resistance. When prepared from magnesium oxide, the specific additive improves the creak resistance by improving the damping property of the friction material.

In order to sufficiently attain the aforementioned effects, the sintered friction material preferably contains the specific additive, the graphite and the potassium titanate by 1 to 15%, 10 to 50% and 5 to 30% in volume ratio respectively.

The frictional force is insufficiently improved if the volume ratio of zirconium oxide is smaller than 1%, while the effect of suppressing abrasion of the counterpart is reduced due to removal of the counterpart if this volume ratio exceeds 15%. Zircon ($ZrSiO_4$) may be employed in place of or along with zirconium oxide.

The frictional force is insufficiently improved if the volume ratio of silica is smaller than 1%, while the effect of suppressing abrasion of the counterpart is reduced due to removal of the counterpart if this volume ratio exceeds 15%. Silica is preferably prepared from at least one of crystal silica obtained by crushing natural ore as such, fused silica obtained by fusing and vitrifying ore at a high temperature of at least 1800° C. and thereafter crushing the same, and industrially synthesized amorphous silica.

The frictional force is insufficiently improved if the volume ratio of dolomite is smaller than 1%, while the matrix is inhibited from sintering and the material strength is reduced if this volume ratio exceeds 15%.

The judder resistance is insufficiently improved if the volume ratio of orthoclase is smaller than 1%, while the matrix is inhibited from sintering and the material strength is reduced if this volume ratio exceeds 15%.

The creak resistance is insufficient if the volume ratio of magnesium oxide is smaller than 1%, while the matrix is inhibited from sintering and the material strength is reduced if this volume ratio exceeds 15%.

The abrasion resistance of the friction material is insufficiently improved if the volume ratio of graphite is smaller than 10%, while the material strength is remarkably reduced to deteriorate the abrasion resistance if this volume ratio exceeds 50%.

The effect of suppressing abrasion of the counterpart is insufficient and the effect of maintaining the material strength is not attained if the volume ratio of potassium titanate is smaller than 5%, while the effect of maintaining the material strength is saturated to result in reduction of the material strength and deterioration of the abrasion resistance if this volume ratio exceeds 30%.

While potassium titanate is a compound expressed in a general formula $K_2O \cdot nTiO_2$, a practical friction conditioner is obtained when n is equal to 2, 4, 6 or 8. Potassium hexatitanate is particularly preferable. Alternatively, a composite material prepared by granularly sintering potassium titanate and calcium titanate may be employed.

The grain size of zirconium oxide is suitably in the range of 0.5 to 200 μm. If the grain size is smaller than the lower limit of this range, the zirconium oxide cannot remove an oxide film adhering to the surface of the counterpart and no improvement of the frictional force is attained. If the grain size exceeds the upper limit of the above range, on the other hand, the zirconium oxide removes not only an oxide film adhering to the surface of the counterpart but also the counterpart itself, and hence the effect of suppressing abrasion of the counterpart is deteriorated.

The grain size of silica is suitably in the range of 0.5 to 200 μm. If the grain size is smaller than the lower limit of this range, the silica cannot remove an oxide film adhering to the surface of the counterpart and no improvement of the frictional force is attained. If the grain size exceeds the upper limit of the above range, on the other hand, the silica removes not only an oxide film adhering to the surface of the counterpart but also the counterpart itself, and hence the effect of suppressing abrasion of the counterpart is deteriorated.

The grain size of dolomite is suitably in the range of 0.5 to 200 μm. If the grain size is smaller than the lower limit of this range, the dolomite cannot remove an oxide film adhering to the surface of the counterpart and no improvement of frictional force is attained. If the grain size of the dolomite exceeds the upper limit of the above range, on the other hand, the matrix is inhibited from sintering and the material strength is reduced. Dolomite is preferably prepared either by crushing natural ore as such or baking the same.

The grain size of orthoclase is suitably in the range of 0.5 to 200 μm. If the grain size of the orthoclase is smaller than the lower limit of this range, the matrix is inhibited from sintering and the material strength is reduced. If the grain size of the orthoclase exceeds the upper limit of the above range, on the other hand, judder resistance is insufficiently improved.

The grain size of magnesium oxide is suitably in the range of 0.5 to 200 μm. If the grain size of the magnesium oxide is smaller than the lower limit of this range, the matrix is inhibited from sintering and the material strength is reduced. If the grain size of the magnesium oxide exceeds the upper limit of the above range, on the other hand, no improvement of the damping property of the friction material is attained and the creak resistance is insufficiently improved.

The grain size of graphite is suitably in the range of 10 to 1000 μm. If the grain size of the graphite is smaller than the lower limit of this range, the matrix is inhibited from sintering and the material strength is reduced to deteriorate the abrasion resistance of the friction material. If the grain size exceeds the upper limit of the above range, on the other hand, segregation of the graphite is so remarkable that it is difficult to ensure a homogeneously dispersed state.

The form of potassium titanate is preferably at least one of whiskery, platy (or plate-like) and spherical forms. In particular, spherical potassium titanate is more preferable as compared with whiskery and platy ones in the following points:

(1) The spherical potassium titanate less reduces the material strength as compared with the whiskery and platy ones.

(2) The spherical potassium titanate is hardly crushed but homogeneously dispersed as such when mixed into the material powder.

(3) The spherical potassium titanate is less segregated due to excellent flowability of the mixed powder when introduced into a mold.

(4) The spherical potassium titanate has a remarkable effect of improving the damping property of the sintered body and suppressing creaking due to internal friction of spherical grains.

A further friction conditioner, a preservative and/or a lubricant may be added to the sintered friction material according to the present invention in a proper amount as needed as a matter of course. For example, barium sulfate, magnetite, fluorite and/or molybdenum disulfate may be added to the inventive sintered friction material.

The foregoing and other objects, features, aspects and advantages of the present invention will become more apparent from the following detailed description of the present invention.

DESCRIPTION OF THE PREFERRED EMBODIMENTS

Examples of the present invention are now described.

(TEST EXAMPLE 1)

Mixed powder materials were prepared by blending matrices, zirconium oxide, graphite and potassium titanate in the ratios shown in Table 1, molded into green compacts under a pressure of 2 to 5 tons/cm$^2$ and thereafter sintered in an $N_2$ atmosphere at 750° C. for 20 to 90 minutes, thereby preparing samples Nos. 1 to 31 of sintered friction materials.

TABLE 1

| Sample No. | Classification | Matrix Cu | Sn | Ni | Al | Total Ratio (Vol. %) | Zirconium Oxide Ratio (Vol. %) | Grain Size ($\mu$m) | Graphite Ratio (Vol. %) | Grain Size ($\mu$m) | Potassium Titanate Whiskery | Platy | Spherical | Total Ratio (Vol. %) |
|---|---|---|---|---|---|---|---|---|---|---|---|---|---|---|
| 1 | inventive | 34 | 5 | 0 | 0 | 39 | 14 | 0.5~200 | 30 | 200~400 | 0 | 0 | 17 | 17 |
| 2 | inventive | 33 | 5 | 0 | 0 | 38 | 2 | 0.5~200 | 45 | 200~400 | 0 | 0 | 15 | 15 |
| 3 | inventive | 33 | 5 | 0 | 0 | 38 | 8 | 0.5~200 | 24 | 200~400 | 0 | 0 | 30 | 30 |
| 4 | inventive | 33 | 5 | 0 | 0 | 38 | 14 | 0.5~200 | 20 | 200~400 | 0 | 0 | 28 | 28 |
| 5 | inventive | 37.5 | 5.5 | 0 | 0 | 43 | 14 | 0.5~200 | 15 | 200~400 | 0 | 0 | 28 | 28 |
| 6 | inventive | 36 | 5 | 0 | 0 | 41 | 14 | 0.5~200 | 40 | 200~400 | 0 | 0 | 5 | 5 |
| 7 | inventive | 36 | 5 | 0 | 0 | 41 | 14 | 0.5~200 | 30 | 200~400 | 0 | 0 | 15 | 15 |
| 8 | inventive | 33 | 5 | 0 | 0 | 38 | 8 | 0.5~200 | 40 | 200~400 | 0 | 0 | 14 | 14 |
| 9 | inventive | 33 | 5 | 0 | 0 | 38 | 8 | 0.5~200 | 40 | 200~400 | 0 | 14 | 0 | 14 |
| 10 | inventive | 33 | 5 | 0 | 0 | 38 | 8 | 0.5~200 | 40 | 200~400 | 14 | 0 | 0 | 14 |
| 11 | inventive | 33 | 5 | 0 | 0 | 38 | 8 | 0.5~200 | 40 | 200~400 | 0 | 7 | 7 | 14 |
| 12 | inventive | 33 | 5 | 0 | 0 | 38 | 8 | 0.5~200 | 40 | 200~400 | 7 | 0 | 7 | 14 |
| 13 | comparative | 33 | 5 | 0 | 0 | 38 | 0.5 | 0.5~200 | 43 | 200~400 | 0 | 0 | 18.5 | 18.5 |
| 14 | comparative | 33 | 5 | 0 | 0 | 38 | 18 | 0.5~200 | 33 | 200~400 | 0 | 0 | 11 | 11 |
| 15 | comparative | 48 | 7 | 0 | 0 | 55 | 15 | 0.5~200 | 5 | 200~400 | 0 | 0 | 25 | 25 |
| 16 | comparative | 32 | 5 | 0 | 0 | 37 | 2 | 0.5~200 | 55 | 200~400 | 0 | 0 | 6 | 6 |
| 17 | comparative | 33 | 5 | 0 | 0 | 38 | 15 | 0.5~200 | 44 | 200~400 | 0 | 0 | 3 | 3 |
| 18 | comparative | 33 | 5 | 0 | 0 | 38 | 5 | 0.5~200 | 25 | 200~400 | 0 | 0 | 32 | 32 |
| 19 | comparative | 33 | 5 | 0 | 0 | 38 | 8 | 0.01~0.4 | 40 | 200~400 | 0 | 0 | 14 | 14 |
| 20 | comparative | 33 | 5 | 0 | 0 | 38 | 8 | 220~400 | 40 | 200~400 | 0 | 0 | 14 | 14 |
| 21 | comparative | 33 | 5 | 0 | 0 | 38 | 8 | 0.5~200 | 40 | 0.1~8 | 0 | 0 | 14 | 14 |
| 22 | comparative | 33 | 5 | 0 | 0 | 38 | 8 | 0.5~200 | 40 | 1200~2000 | 0 | 0 | 14 | 14 |
| 23 | inventive | 24 | 3 | 11 | 0 | 38 | 8 | 0.5~200 | 40 | 200~400 | 0 | 0 | 14 | 14 |
| 24 | inventive | 24 | 3 | 11 | 0 | 38 | 8 | 0.5~200 | 40 | 200~400 | 0 | 14 | 0 | 14 |
| 25 | inventive | 24 | 3 | 11 | 0 | 38 | 8 | 0.5~200 | 40 | 200~400 | 14 | 0 | 0 | 14 |
| 26 | inventive | 23 | 3 | 10 | 2 | 38 | 8 | 0.5~200 | 40 | 200~400 | 0 | 0 | 14 | 14 |
| 27 | inventive | 23 | 3 | 10 | 2 | 38 | 8 | 0.5~200 | 40 | 200~400 | 0 | 14 | 0 | 14 |
| 28 | inventive | 23 | 3 | 10 | 2 | 38 | 8 | 0.5~200 | 40 | 200~400 | 14 | 0 | 0 | 14 |
| 29 | comparative | 40 | 6 | 0 | 0 | 46 | 14 | 0.5~200 | 40 | 200~400 | 0 | 0 | 0 | 0 |
| 30 | comparative | 27 | 4 | 15 | 0 | 46 | 14 | 0.5~200 | 40 | 200~400 | 0 | 0 | 0 | 0 |
| 31 | comparative | 27 | 4 | 12 | 3 | 46 | 14 | 0.5~200 | 40 | 200~400 | 0 | 0 | 0 | 0 |

A general performance test was made on the samples in accordance with the JASO C406-82 passenger car braking device dynamometer test method. The ranges of friction coefficients were measured at initial braking speeds of 50 km/h and 100 km/h and deceleration of 0.1 to 0.9 G in a second effectiveness test. Abrasion loss values of the samples and the counterparts of cast iron were measured before and after the general performance test. Table 2 shows the results. Referring to Tables 1 and 2, the samples Nos. 1 to 12 and 23 to 28 are inventive samples, and the samples Nos. 13 to 22 and Nos. 29 to 31 are comparative samples. In the columns of "Classification", "inventive" and "comparative" indicate the inventive and comparative samples respectively.

TABLE 2

| Sample No. | Classification | Friction Coefficient | Abrasion Loss (mm) | Abrasion Loss of Counterpart (mm) | Appearance after Friction Test |
|---|---|---|---|---|---|
| 1 | inventive | 0.40~0.48 | 0.12 | 0.05 | excellent with neither chipping nor cracking |
| 2 | inventive | 0.33~0.40 | 0.10 | 0.05 | excellent with neither chipping nor cracking |
| 3 | inventive | 0.35~0.45 | 0.13 | 0.04 | excellent with neither chipping nor cracking |
| 4 | inventive | 0.40~0.48 | 0.14 | 0.04 | excellent with neither chipping nor cracking |
| 5 | inventive | 0.40~0.48 | 0.15 | 0.04 | excellent with neither chipping nor cracking |
| 6 | inventive | 0.40~0.48 | 0.10 | 0.09 | excellent with neither chipping nor cracking |
| 7 | inventive | 0.40~0.48 | 0.12 | 0.05 | excellent with neither chipping nor cracking |
| 8 | inventive | 0.38~0.45 | 0.10 | 0.05 | excellent with neither chipping nor cracking |
| 9 | inventive | 0.35~0.45 | 0.10 | 0.05 | excellent with neither chipping nor cracking |
| 10 | inventive | 0.35~0.45 | 0.10 | 0.05 | excellent with neither chipping nor cracking |
| 11 | inventive | 0.37~0.45 | 0.10 | 0.05 | excellent with neither chipping nor cracking |
| 12 | inventive | 0.37~0.45 | 0.10 | 0.05 | excellent with neither chipping nor cracking |
| 13 | comparative | 0.15~0.25 | 0.25 | 0.06 | excellent with neither chipping nor cracking |
| 14 | comparative | 0.35~0.50 | 0.22 | 0.30 | corner chipped |
| 15 | comparative | 0.35~0.45 | 0.50 | 0.09 | excellent with neither chipping nor cracking |
| 16 | comparative | 0.30~0.40 | 0.45 | 0.08 | corner chipped |
| 17 | comparative | 0.35~0.45 | 0.20 | 0.30 | corner chipped |
| 18 | comparative | 0.35~0.45 | 0.45 | 0.25 | corner chipped |
| 19 | comparative | 0.15~0.25 | 0.25 | 0.09 | excellent with neither chipping nor cracking |

TABLE 2-continued

| Sample No. | Classification | Friction Coefficient | Abrasion Loss (mm) | Abrasion Loss of Counterpart (mm) | Appearance after Friction Test |
|---|---|---|---|---|---|
| 20 | comparative | 0.25~0.45 | 0.20 | 0.30 | corner chipped |
| 21 | comparative | 0.32~0.40 | 0.30 | 0.09 | corner chipped |
| 22 | comparative | 0.25~0.50 | 0.35 | 0.18 | corner chipped |
| 23 | inventive | 0.36~0.47 | 0.12 | 0.05 | excellent with neither chipping nor cracking |
| 24 | inventive | 0.36~0.47 | 0.12 | 0.06 | excellent with neither chipping nor cracking |
| 25 | inventive | 0.36~0.47 | 0.12 | 0.06 | excellent with neither chipping nor cracking |
| 26 | inventive | 0.38~0.48 | 0.13 | 0.05 | excellent with neither chipping nor cracking |
| 27 | inventive | 0.38~0.48 | 0.13 | 0.06 | excellent with neither chipping nor cracking |
| 28 | inventive | 0.38~0.48 | 0.13 | 0.06 | excellent with neither chipping nor cracking |
| 29 | comparative | 0.35~0.45 | 0.30 | 0.50 | corner chipped |
| 30 | comparative | 0.36~0.47 | 0.32 | 0.52 | corner chipped |
| 31 | comparative | 0.38~0.48 | 0.35 | 0.55 | corner chipped |

As understood from Table 2, the samples Nos. 1 to 12 having matrices of copper and tin exhibited high friction coefficients and small abrasion loss values of the friction materials and the counterparts. It is also understood that the samples Nos. 1 to 12 were sufficient in strength with neither chipping nor cracking on the appearances after the test.

On the other hand, the samples Nos. 13 to 22, similarly having matrices of copper and tin, were insufficient as friction materials as described below:

The sample No. 13 containing zirconium oxide in a ratio smaller than those of the remaining samples exhibited an insufficient friction coefficient for serving as a friction material. The sample No. 14 containing zirconium oxide in a high ratio removed not only an oxide film adhering to the surface of the counterpart but also the counterpart itself, which was remarkably abraded.

The sample No. 15 containing graphite in a ratio smaller than those of the remaining samples exhibited high abrasion loss. The sample No. 16 containing graphite in a high ratio was remarkably reduced in material strength and increased in abrasion loss.

The sample No. 17 containing potassium titanate in a ratio smaller than those of the remaining samples remarkably abraded the counterpart and had an insufficient effect of suppressing abrasion of the counterpart. The sample No. 18 containing potassium titanate in a ratio larger than those of the remaining samples was reduced in material strength and increased in abrasion loss.

The sample No. 19 containing zirconium oxide in a grain size smaller than those of the remaining samples was incapable of removing an oxide film or the like adhering to the surface of the counterpart and exhibited an insufficient friction coefficient for serving as a friction material. The sample No. 20 containing zirconium oxide in a grain size larger than those of the remaining samples removed not only an oxide film adhering to the surface of the counterpart but also the counterpart itself, which was remarkably abraded.

The sample No. 21 containing graphite in a grain size smaller than those of the remaining samples was inhibited from sintering of the matrix, reduced in material strength and deteriorated in abrasion resistance. The sample No. 22 containing graphite in a grain size larger than those of the remaining samples was incapable of ensuring a homogeneous dispersed state and obtaining a stable friction coefficient due to remarkable segregation of graphite, and increased in abrasion loss.

The samples Nos. 23 to 25 having matrices of copper, tin and nickel exhibited higher friction coefficients as compared with those of the samples Nos. 1 to 12, with small abrasion loss of the friction materials and the counterparts. Further, the samples Nos. 23 to 25 were sufficient in strength for serving as friction materials with neither chipping nor cracking on the appearances after the test.

The samples Nos. 26 to 28 having matrices of copper, tin, nickel and aluminum exhibited higher friction coefficients as compared with those of the samples Nos. 23 and 25, with small abrasion loss of the friction materials and the counterparts. Further, the samples Nos. 26 to 28 were sufficient in strength for serving as friction materials with neither chipping nor cracking on the appearances after the test. On the other hand, the samples Nos. 29 to 31 of conventional sintered friction materials containing no potassium titanate exhibited insufficient effects of suppressing abrasion of the counterparts with remarkable abrasion loss of the counterparts due to the absence of potassium titanate.

(TEST EXAMPLE 2)

Mixed powder materials were prepared by blending matrices, silica, graphite and potassium titanate in the ratios shown in Table 3, molded into green compacts under a pressure of 2 to 5 tons/cm$^2$ and thereafter sintered in an N$_2$ atmosphere at 750° C. for 20 to 90 minutes, thereby preparing samples Nos. 101 to 125 of sintered friction materials.

TABLE 3

| | | Matrix | | | | | Silica | | Graphite | | Potassium Titanate | | | |
|---|---|---|---|---|---|---|---|---|---|---|---|---|---|---|
| | | | | | | Total | | | | | | | | Total |
| Sample No. | Classification | Cu | Sn | Ni | Al | Ratio (Vol. %) | Ratio (Vol. %) | Grain Size (μm) | Ratio (Vol. %) | Grain Size (μm) | Whiskery | Platy | Spherical | Ratio (Vol. %) |
| 101 | inventive | 23 | 3 | 10 | 2 | 38 | 14 | 0.5~200 | 30 | 200~400 | 0 | 0 | 18 | 18 |
| 102 | inventive | 23 | 3 | 10 | 2 | 38 | 2 | 0.5~200 | 45 | 200~400 | 0 | 0 | 15 | 15 |
| 103 | inventive | 23 | 3 | 10 | 2 | 38 | 8 | 0.5~200 | 26 | 200~400 | 0 | 0 | 28 | 28 |
| 104 | inventive | 23 | 3 | 10 | 2 | 38 | 14 | 0.5~200 | 20 | 200~400 | 0 | 0 | 28 | 28 |

TABLE 3-continued

| | | Matrix | | | | | Silica | | Graphite | | Potassium Titanate | | | |
|---|---|---|---|---|---|---|---|---|---|---|---|---|---|---|
| | | | | | | Total Ratio (Vol. %) | Ratio (Vol. %) | Grain Size (μm) | Ratio (Vol. %) | Grain Size (μm) | | | | Total Ratio (Vol. %) |
| Sample No. | Classification | Cu | Sn | Ni | Al | | | | | | Whiskery | Platy | Spherical | |
| 105 | inventive | 26 | 3.4 | 11.3 | 2.3 | 43 | 14 | 0.5~200 | 15 | 200~400 | 0 | 0 | 28 | 28 |
| 106 | inventive | 24.8 | 3.2 | 10.8 | 2.2 | 41 | 14 | 0.5~200 | 40 | 200~400 | 0 | 0 | 5 | 5 |
| 107 | inventive | 24.8 | 3.2 | 10.8 | 2.2 | 41 | 14 | 0.5~200 | 30 | 200~400 | 0 | 0 | 15 | 15 |
| 108 | inventive | 23 | 3 | 10 | 2 | 38 | 8 | 0.5~200 | 40 | 200~400 | 0 | 0 | 14 | 14 |
| 109 | inventive | 23 | 3 | 10 | 2 | 38 | 8 | 0.5~200 | 40 | 200~400 | 0 | 14 | 0 | 14 |
| 110 | inventive | 23 | 3 | 10 | 2 | 38 | 8 | 0.5~200 | 40 | 200~400 | 14 | 0 | 0 | 14 |
| 111 | inventive | 23 | 3 | 10 | 2 | 38 | 8 | 0.5~200 | 40 | 200~400 | 0 | 7 | 7 | 14 |
| 112 | inventive | 23 | 3 | 10 | 2 | 38 | 8 | 0.5~200 | 40 | 200~400 | 7 | 0 | 7 | 14 |
| 113 | comparative | 23 | 3 | 10 | 2 | 38 | 0.5 | 0.5~200 | 43 | 200~400 | 0 | 0 | 18.5 | 18.5 |
| 114 | comparative | 23 | 3 | 10 | 2 | 38 | 18 | 0.5~200 | 33 | 200~400 | 0 | 0 | 11 | 11 |
| 115 | comparative | 33.3 | 4.3 | 14.5 | 2.9 | 55 | 15 | 0.5~200 | 5 | 200~400 | 0 | 0 | 25 | 25 |
| 116 | comparative | 22.4 | 2.9 | 9.7 | 2.0 | 37 | 2 | 0.5~200 | 55 | 200~400 | 0 | 0 | 6 | 6 |
| 117 | comparative | 23 | 3 | 10 | 2 | 38 | 15 | 0.5~200 | 44 | 200~400 | 0 | 0 | 3 | 3 |
| 118 | comparative | 23 | 3 | 10 | 2 | 38 | 5 | 0.5~200 | 25 | 200~400 | 0 | 0 | 32 | 32 |
| 119 | comparative | 23 | 3 | 10 | 2 | 38 | 8 | 0.01~0.4 | 40 | 200~400 | 0 | 0 | 14 | 14 |
| 120 | comparative | 23 | 3 | 10 | 2 | 38 | 8 | 220~400 | 40 | 200~400 | 0 | 0 | 14 | 14 |
| 121 | comparative | 23 | 3 | 10 | 2 | 38 | 8 | 0.5~200 | 40 | 0.1~8 | 0 | 0 | 14 | 14 |
| 122 | comparative | 23 | 3 | 10 | 2 | 38 | 8 | 0.5~200 | 40 | 1200~2000 | 0 | 0 | 14 | 14 |
| 123 | comparative | 27 | 4 | 12 | 3 | 46 | 14 | 0.5~200 | 40 | 200~400 | 0 | 0 | 0 | 0 |
| 124 | comparative | 26 | 3.4 | 11.3 | 2.3 | 43 | 14 | 0.5~200 | 43 | 200~400 | 0 | 0 | 0 | 0 |
| 125 | comparative | 24.8 | 3.2 | 10.8 | 2.2 | 41 | 14 | 0.5~200 | 45 | 200~400 | 0 | 0 | 0 | 0 |

A general performance test was carried out on the samples in accordance with the JASO C406-82 passenger car braking device dynamometer test method. The ranges of friction coefficients were measured at initial braking speeds of 50 km/h and 100 km/h and deceleration of 0.1 to 0.9 G in a second effectiveness test. Abrasion loss values of the samples and the counterparts of cast iron were measured before and after the general performance test. Table 4 shows the results. Referring to Tables 3 and 4, the samples Nos. 101 to 112 are inventive samples, and the samples Nos. 113 to 125 are comparative samples. In the columns of "Classification", "inventive" and "comparative" indicate the inventive and comparative samples respectively.

TABLE 4

| Sample No. | Classification | Friction Coefficient | Abrasion Loss (mm) | Abrasion Loss of Counterpart (mm) |
|---|---|---|---|---|
| 101 | inventive | 0.48~0.55 | 0.12 | 0.06 |
| 102 | inventive | 0.45~0.50 | 0.09 | 0.05 |
| 103 | inventive | 0.46~0.53 | 0.13 | 0.04 |
| 104 | inventive | 0.48~0.55 | 0.14 | 0.04 |
| 105 | inventive | 0.48~0.56 | 0.15 | 0.04 |
| 106 | inventive | 0.48~0.54 | 0.10 | 0.09 |
| 107 | inventive | 0.48~0.54 | 0.12 | 0.05 |
| 108 | inventive | 0.46~0.52 | 0.10 | 0.05 |
| 109 | inventive | 0.46~0.52 | 0.10 | 0.05 |
| 110 | inventive | 0.46~0.52 | 0.10 | 0.05 |
| 111 | inventive | 0.46~0.52 | 0.10 | 0.05 |
| 112 | inventive | 0.46~0.52 | 0.10 | 0.05 |
| 113 | comparative | 0.20~0.28 | 0.25 | 0.06 |
| 114 | comparative | 0.45~0.55 | 0.22 | 0.45 |
| 115 | comparative | 0.40~0.48 | 0.50 | 0.09 |
| 116 | comparative | 0.30~0.40 | 0.45 | 0.08 |
| 117 | comparative | 0.45~0.50 | 0.20 | 0.30 |
| 118 | comparative | 0.46~0.53 | 0.45 | 0.25 |
| 119 | comparative | 0.18~0.28 | 0.25 | 0.09 |
| 120 | comparative | 0.45~0.58 | 0.20 | 0.30 |
| 121 | comparative | 0.46~0.53 | 0.40 | 0.09 |
| 122 | comparative | 0.35~0.58 | 0.35 | 0.18 |
| 123 | comparative | 0.48~0.58 | 0.30 | 0.55 |
| 124 | comparative | 0.48~0.56 | 0.26 | 0.52 |
| 125 | comparative | 0.48~0.54 | 0.22 | 0.50 |

As understood from Table 4, the samples Nos. 101 to 112 having matrices of copper, tin, nickel and aluminum exhibited high friction coefficients and small abrasion loss values of the friction materials and the counterparts. It is also understood that the samples Nos. 101 to 112 were sufficient in strength with neither chipping nor cracking on the appearances after the test.

On the other hand, the samples Nos. 113 to 125, similarly having matrices of copper, tin, nickel and aluminum, were insufficient as friction materials as described below:

The sample No. 113 containing silica in a ratio smaller than those of the remaining samples exhibited an insufficient friction coefficient for serving as a friction material. The sample No. 114 containing silica in a high ratio removed not only an oxide film adhering to the surface of the counterpart but also the counterpart itself, which was remarkably abraded.

The sample No. 115 containing graphite in a ratio smaller than those of the remaining samples exhibited high abrasion loss. The sample No. 116 containing graphite in a high ratio was remarkably reduced in material strength and increased in abrasion loss.

The sample No. 117 containing potassium titanate in a ratio smaller than those of the remaining samples remarkably abraded the counterpart and had an insufficient effect of suppressing abrasion of the counterpart. The sample No. 118 containing potassium titanate in a ratio larger than those of the remaining samples was reduced in material strength and increased in abrasion loss.

The sample No. 119 containing silica in a grain size smaller than those of the remaining samples was incapable of removing an oxide film or the like adhering to the surface of the counterpart and exhibited an insufficient friction coefficient for serving as a friction material. The sample No. 120 containing silica in a grain size larger than those of the remaining samples removed not only an oxide film adhering to the surface of the counterpart but also the counterpart itself, which was remarkably abraded.

The sample No. 121 containing graphite in a grain size smaller than those of the remaining samples was inhibited from sintering of the matrix, reduced in material strength and deteriorated in abrasion resistance. The sample No. 122 containing graphite in a grain size larger than those of the remaining samples was incapable of ensuring a homogeneous dispersed state and obtaining a stable friction coefficient due to remarkable segregation of graphite, and increased in abrasion loss.

The samples Nos. 123 to 125 of conventional sintered friction materials containing no potassium titanate exhibited insufficient effects of suppressing abrasion of the counterparts with remarkable abrasion loss of the counterparts due to the absence of potassium titanate.

(TEST EXAMPLE 3)

Mixed powder materials were prepared by blending matrices, dolomite, graphite and potassium titanate in the ratios shown in Table 5, molded into green compacts under a pressure of 2 to 5 tons/cm$^2$ and thereafter sintered in an $N_2$ atmosphere at 750° C. for 20 to 90 minutes, thereby preparing samples Nos. 201 to 225 of sintered friction materials.

A general performance test was made on the samples in accordance with the JASO C406-82 passenger car braking device dynamometer test method. The ranges of friction coefficients were measured at initial braking speeds of 50 km/h and 100 km/h and deceleration of 0.1 to 0.9 G in a second effectiveness test. Abrasion loss values of the samples were measured before and after the general performance test. Further, bending test pieces were collected from the respective samples for performing a three-point bending test under conditions shown in Table 6. Table 7 shows the results. Referring to Tables 5 and 7, the samples Nos. 201 to 212 are inventive samples, and the samples Nos. 213 to 225 are comparative samples. In the columns of "Classification", "inventive" and "comparative" indicate the inventive and comparative samples respectively.

TABLE 6

| | |
|---|---|
| Dimensions of Test Piece (mm) | 7 (width) by 5 (thickness) by 30 (length) |
| Distance between Support Points (mm) | 20 |
| Load System | three-point bending |
| Crosshead Speed (mm/min.) | 0.5 |

TABLE 5

| | | Matrix | | | | | | | | | Potassium Titanate | | | |
|---|---|---|---|---|---|---|---|---|---|---|---|---|---|---|
| | | | | | | Total | Dolomite | | Graphite | | | | | Total |
| Sample No. | Classification | Cu | Sn | Ni | Al | Ratio (Vol. %) | Ratio (Vol. %) | Grain Size (μm) | Ratio (Vol. %) | Grain Size (μm) | Whiskery | Platy | Spherical | Ratio (Vol. %) |
| 201 | inventive | 23 | 3 | 10 | 2 | 38 | 14 | 0.5~200 | 30 | 200~500 | 0 | 0 | 18 | 18 |
| 202 | inventive | 23 | 3 | 10 | 2 | 38 | 2 | 0.5~200 | 45 | 200~500 | 0 | 0 | 15 | 15 |
| 203 | inventive | 23 | 3 | 10 | 2 | 38 | 8 | 0.5~200 | 26 | 200~500 | 0 | 0 | 28 | 28 |
| 204 | inventive | 23 | 3 | 10 | 2 | 38 | 14 | 0.5~200 | 20 | 200~500 | 0 | 0 | 28 | 28 |
| 205 | inventive | 26 | 3.4 | 11.3 | 2.3 | 43 | 14 | 0.5~200 | 15 | 200~500 | 0 | 0 | 28 | 28 |
| 206 | inventive | 24.8 | 3.2 | 10.8 | 2.2 | 41 | 14 | 0.5~200 | 40 | 200~500 | 0 | 0 | 5 | 5 |
| 207 | inventive | 24.8 | 3.2 | 10.8 | 2.2 | 41 | 14 | 0.5~200 | 30 | 200~500 | 0 | 0 | 15 | 15 |
| 208 | inventive | 23 | 3 | 10 | 2 | 38 | 8 | 0.5~200 | 40 | 200~500 | 0 | 0 | 14 | 14 |
| 209 | inventive | 23 | 3 | 10 | 2 | 38 | 8 | 0.5~200 | 40 | 200~500 | 0 | 14 | 0 | 14 |
| 210 | inventive | 23 | 3 | 10 | 2 | 38 | 8 | 0.5~200 | 40 | 200~500 | 14 | 0 | 0 | 14 |
| 211 | inventive | 23 | 3 | 10 | 2 | 38 | 8 | 0.5~200 | 40 | 200~500 | 0 | 7 | 7 | 14 |
| 212 | inventive | 23 | 3 | 10 | 2 | 38 | 8 | 0.5~200 | 40 | 200~500 | 7 | 0 | 7 | 14 |
| 213 | comparative | 23 | 3 | 10 | 2 | 38 | 0.5 | 0.5~200 | 43 | 200~500 | 0 | 0 | 18.5 | 18.5 |
| 214 | comparative | 23 | 3 | 10 | 2 | 38 | 18 | 0.5~200 | 33 | 200~500 | 0 | 0 | 11 | 11 |
| 215 | comparative | 33.3 | 4.3 | 14.5 | 2.9 | 55 | 15 | 0.5~200 | 5 | 200~500 | 0 | 0 | 25 | 25 |
| 216 | comparative | 22.4 | 2.9 | 9.7 | 2.0 | 37 | 2 | 0.5~200 | 55 | 200~500 | 0 | 0 | 6 | 6 |
| 217 | comparative | 23 | 3 | 10 | 2 | 38 | 15 | 0.5~200 | 44 | 200~500 | 0 | 0 | 3 | 3 |
| 218 | comparative | 23 | 3 | 10 | 2 | 38 | 5 | 0.5~200 | 25 | 200~500 | 0 | 0 | 32 | 32 |
| 219 | comparative | 23 | 3 | 10 | 2 | 38 | 8 | 0.01~0.4 | 40 | 200~500 | 0 | 0 | 14 | 14 |
| 220 | comparative | 23 | 3 | 10 | 2 | 38 | 8 | 220~400 | 40 | 200~500 | 0 | 0 | 14 | 14 |
| 221 | comparative | 23 | 3 | 10 | 2 | 38 | 8 | 0.5~200 | 40 | 0.1~8 | 0 | 0 | 14 | 14 |
| 222 | comparative | 23 | 3 | 10 | 2 | 38 | 8 | 0.5~200 | 40 | 1200~2000 | 0 | 0 | 14 | 14 |
| 223 | comparative | 27 | 4 | 12 | 3 | 46 | 14 | 0.5~200 | 40 | 200~500 | 0 | 0 | 0 | 0 |
| 224 | comparative | 26 | 3.4 | 11.3 | 2.3 | 43 | 14 | 0.5~200 | 43 | 200~500 | 0 | 0 | 0 | 0 |
| 225 | comparative | 24.8 | 3.2 | 10.8 | 2.2 | 41 | 14 | 0.5~200 | 45 | 200~500 | 0 | 0 | 0 | 0 |

TABLE 7

| Sample No. | Classification | Friction Coefficient | Abrasion Loss of Friction Material (mm) | Appearance after Friction Test | Bending Strength (Mpa) |
|---|---|---|---|---|---|
| 201 | inventive | 0.47~0.54 | 0.12 | excellent with neither chipping nor cracking | at least 40 |
| 202 | inventive | 0.44~0.50 | 0.09 | excellent with neither chipping nor cracking | at least 40 |
| 203 | inventive | 0.46~0.53 | 0.13 | excellent with neither chipping nor cracking | at least 40 |
| 204 | inventive | 0.48~0.55 | 0.14 | excellent with neither chipping nor cracking | at least 40 |
| 205 | inventive | 0.48~0.55 | 0.15 | excellent with neither chipping nor cracking | at least 40 |
| 206 | inventive | 0.48~0.53 | 0.10 | excellent with neither chipping nor cracking | at least 40 |
| 207 | inventive | 0.48~0.53 | 0.12 | excellent with neither chipping nor cracking | at least 40 |
| 208 | inventive | 0.46~0.51 | 0.10 | excellent with neither chipping nor cracking | at least 40 |
| 209 | inventive | 0.46~0.51 | 0.10 | excellent with neither chipping nor cracking | at least 40 |
| 210 | inventive | 0.46~0.51 | 0.10 | excellent with neither chipping nor cracking | at least 40 |
| 211 | inventive | 0.46~0.51 | 0.10 | excellent with neither chipping nor cracking | at least 40 |
| 212 | inventive | 0.46~0.51 | 0.10 | excellent with neither chipping nor cracking | at least 40 |
| 213 | comparative | 0.20~0.27 | 0.25 | excellent with neither chipping nor cracking | at least 40 |
| 214 | comparative | 0.45~0.53 | 0.22 | corner chipped | 15 |
| 215 | comparative | 0.40~0.47 | 1.10 | excellent with neither chipping nor cracking | at least 40 |
| 216 | comparative | 0.30~0.40 | 0.95 | corner chipped | 10 |
| 217 | comparative | 0.45~0.50 | 0.20 | corner chipped | 24 |
| 218 | comparative | 0.46~0.52 | 0.80 | corner chipped | 26 |
| 219 | comparative | 0.18~0.25 | 0.25 | excellent with neither chipping nor cracking | at least 40 |
| 220 | comparative | 0.45~0.56 | 0.20 | corner chipped | 10 |
| 221 | comparative | 0.44~0.52 | 0.50 | corner chipped | 8 |
| 222 | comparative | 0.33~0.55 | 0.60 | corner chipped | 10 |
| 223 | comparative | 0.48~0.56 | 0.26 | corner chipped | 26 |
| 224 | comparative | 0.48~0.55 | 0.24 | corner chipped | 24 |
| 225 | comparative | 0.48~0.53 | 0.22 | corner chipped | 22 |

As understood from Table 7, the samples Nos. 201 to 212 having matrices of copper, tin, nickel and aluminum exhibited high friction coefficients and had neither chipping nor cracking on the appearances after the test. It is also understood that the samples Nos. 201 to 212 maintained a bending strength of at least 40 MPa and had sufficient strength for serving as friction materials.

On the other hand, the samples Nos. 213 to 225, similarly having matrices of copper, tin, nickel and aluminum, were insufficient as friction materials as described below:

The sample No. 213 containing dolomite in a ratio smaller than those of the remaining samples exhibited an insufficient friction coefficient for serving as a friction material. The sample No. 214 containing dolomite in a high ratio was inhibited from sintering of the matrix and reduced in material strength.

The sample No. 215 containing graphite in a ratio smaller than those of the remaining samples exhibited high abrasion loss. The sample No. 216 containing graphite in a high ratio was remarkably reduced in material strength and increased in abrasion loss.

The sample No. 217 containing potassium titanate in a ratio smaller than those of the remaining samples was reduced in material strength with no effect of maintaining the material strength. The sample No. 218 containing potassium titanate in a ratio larger than those of the remaining samples was reduced in material strength and increased in abrasion loss.

The sample No. 219 containing dolomite in a grain size smaller than those of the remaining samples was incapable of removing an oxide film or the like adhering to the surface of the counterpart and exhibited an insufficient friction coefficient for serving as a friction material. The sample No. 220 containing dolomite in a grain size larger than those of the remaining samples was inhibited from sintering of the matrix and reduced in material strength.

The sample No. 221 containing graphite in a grain size smaller than those of the remaining samples was inhibited from sintering of the matrix, reduced in material strength and deteriorated in abrasion resistance. The sample No. 222 containing graphite in a grain size larger than those of the remaining samples was incapable of ensuring a homogeneous dispersed state due to remarkable segregation of the graphite, reduced in material strength and increased in abrasion loss.

The samples Nos. 223 to 225 of conventional sintered friction materials containing no potassium titanate exhibited did not exhibit an effect of maintaining material strength and were reduced in material strength and suffered increased abrasion loss due to the absence of potassium titanate.

(TEST EXAMPLE 4)

Mxed powder materials were prepared by blending matrices, orthoclase, graphite and potassium titanate in the ratios shown in Table 8, molded into green compacts under a pressure of 2 to 5 tons/cm$^2$ and thereafter sintered in an N$_2$ atmosphere at 750° C. for 20 to 90 minutes, thereby preparing samples Nos. 301 to 325 of sintered friction materials.

TABLE 8

| | | Matrix | | | | | Orthoclase | | Graphite | | Potassium Titanate | | | |
|---|---|---|---|---|---|---|---|---|---|---|---|---|---|---|
| Sample No. | Classification | Cu | Sn | Ni | Al | Total Ratio (Vol. %) | Ratio (Vol. %) | Grain Size (μm) | Ratio (Vol. %) | Grain Size (μm) | Whiskery | Platy | Spherical | Total Ratio (Vol. %) |
| 301 | inventive | 23 | 3 | 10 | 2 | 38 | 12 | 0.5~180 | 30 | 200~600 | 0 | 0 | 20 | 20 |
| 302 | inventive | 23 | 3 | 10 | 2 | 38 | 4 | 0.5~180 | 45 | 200~600 | 0 | 0 | 13 | 13 |

TABLE 8-continued

| | | Matrix | | | | | Orthoclase | | Graphite | | Potassium Titanate | | | Total |
|---|---|---|---|---|---|---|---|---|---|---|---|---|---|---|
| Sample No. | Classification | Cu | Sn | Ni | Al | Total Ratio (Vol. %) | Ratio (Vol. %) | Grain Size (μm) | Ratio (Vol. %) | Grain Size (μm) | Whiskery | Platy | Spherical | Ratio (Vol. %) |
| 303 | inventive | 23 | 3 | 10 | 2 | 38 | 8 | 0.5~180 | 26 | 200~600 | 0 | 0 | 28 | 28 |
| 304 | inventive | 23 | 3 | 10 | 2 | 38 | 13 | 0.5~180 | 21 | 200~600 | 0 | 0 | 28 | 28 |
| 305 | inventive | 26 | 3.4 | 11.3 | 2.3 | 43 | 13 | 0.5~180 | 16 | 200~600 | 0 | 0 | 28 | 28 |
| 306 | inventive | 24.8 | 3.2 | 10.8 | 2.2 | 41 | 13 | 0.5~180 | 41 | 200~600 | 0 | 0 | 5 | 5 |
| 307 | inventive | 24.8 | 3.2 | 10.8 | 2.2 | 41 | 13 | 0.5~180 | 31 | 200~600 | 0 | 0 | 15 | 15 |
| 308 | inventive | 23 | 3 | 10 | 2 | 38 | 8 | 0.5~180 | 40 | 200~600 | 0 | 0 | 14 | 14 |
| 309 | inventive | 23 | 3 | 10 | 2 | 38 | 8 | 0.5~180 | 40 | 200~600 | 0 | 14 | 0 | 14 |
| 310 | inventive | 23 | 3 | 10 | 2 | 38 | 8 | 0.5~180 | 40 | 200~600 | 14 | 0 | 0 | 14 |
| 311 | inventive | 23 | 3 | 10 | 2 | 38 | 8 | 0.5~180 | 40 | 200~600 | 0 | 7 | 7 | 14 |
| 312 | inventive | 23 | 3 | 10 | 2 | 38 | 8 | 0.5~180 | 40 | 200~600 | 7 | 0 | 7 | 14 |
| 313 | comparative | 23 | 3 | 10 | 2 | 38 | 0.5 | 0.5~180 | 43 | 200~600 | 0 | 0 | 18.5 | 18.5 |
| 314 | comparative | 23 | 3 | 10 | 2 | 38 | 18 | 0.5~180 | 33 | 200~600 | 0 | 0 | 11 | 11 |
| 315 | comparative | 33.3 | 4.3 | 14.5 | 2.9 | 55 | 15 | 0.5~180 | 5 | 200~600 | 0 | 0 | 25 | 25 |
| 316 | comparative | 22.4 | 2.9 | 9.7 | 2.0 | 37 | 2 | 0.5~180 | 55 | 200~600 | 0 | 0 | 6 | 6 |
| 317 | comparative | 23 | 3 | 10 | 2 | 38 | 15 | 0.5~180 | 44 | 200~600 | 0 | 0 | 3 | 3 |
| 318 | comparative | 23 | 3 | 10 | 2 | 38 | 5 | 0.5~180 | 25 | 200~600 | 0 | 0 | 32 | 32 |
| 319 | comparative | 23 | 3 | 10 | 2 | 38 | 8 | 0.01~0.4 | 40 | 200~600 | 0 | 0 | 14 | 14 |
| 320 | comparative | 23 | 3 | 10 | 2 | 38 | 8 | 220~400 | 40 | 200~600 | 0 | 0 | 14 | 14 |
| 321 | comparative | 23 | 3 | 10 | 2 | 38 | 8 | 0.5~180 | 40 | 0.1~8 | 0 | 0 | 14 | 14 |
| 322 | comparative | 23 | 3 | 10 | 2 | 38 | 8 | 0.5~180 | 40 | 1200~2000 | 0 | 0 | 14 | 14 |
| 323 | comparative | 27 | 4 | 12 | 3 | 46 | 14 | 0.5~180 | 40 | 200~600 | 0 | 0 | 0 | 0 |
| 324 | comparative | 26 | 3.4 | 11.3 | 2.3 | 43 | 14 | 0.5~180 | 43 | 200~600 | 0 | 0 | 0 | 0 |
| 325 | comparative | 24.8 | 3.2 | 10.8 | 2.2 | 41 | 14 | 0.5~180 | 45 | 200~600 | 0 | 0 | 0 | 0 |

Test pieces were collected from the respective samples for performing a counterpart attackability test as a determination of judder resistance under a low surface pressure with a constant-speed frictional abrasion tester. Table 9 shows the test conditions. Table 10 shows counterpart attack quantities (abrasion depths from reference surfaces) and abrasion loss values of the friction materials. Referring to Tables 8 and 10, the samples Nos. 301 to 312 are inventive samples, and the samples Nos. 313 to 325 are comparative samples. In the columns of "Classification", "inventive" and "comparative" indicate the inventive and comparative samples respectively.

TABLE 9

| Shape of Friction Surface (mm) | 10 × 20 |
|---|---|
| Counterpart | FC200 |
| Peripheral Speed (m/s) | 10 |
| Surface Pressure (kgf/cm$^2$) | 1 |
| Friction Time (hr) | 24 |
| Effective Radius of Friction (m) | 0.1 |

TABLE 10

| Sample No. | Classification | Counterpart Attack Quantity (μm) | Abrasion Loss of Friction Material (mm) |
|---|---|---|---|
| 301 | inventive | not more than 10 | 0.12 |
| 302 | inventive | not more than 10 | 0.09 |
| 303 | inventive | not more than 10 | 0.13 |
| 304 | inventive | not more than 10 | 0.14 |
| 305 | inventive | not more than 10 | 0.15 |
| 306 | inventive | not more than 10 | 0.10 |
| 307 | inventive | not more than 10 | 0.12 |
| 308 | inventive | not more than 10 | 0.10 |
| 309 | inventive | not more than 10 | 0.10 |
| 310 | inventive | not more than 10 | 0.10 |
| 311 | inventive | not more than 10 | 0.10 |
| 312 | inventive | not more than 10 | 0.10 |
| 313 | comparative | 55 | 0.19 |
| 314 | comparative | not more than 10 | 0.70 |
| 315 | comparative | 15 | 1.10 |
| 316 | comparative | 20 | 0.95 |
| 317 | comparative | 14 | 0.50 |
| 318 | comparative | 16 | 0.81 |
| 319 | comparative | not more than 10 | 0.75 |
| 320 | comparative | 105 | 0.19 |
| 321 | comparative | 20 | 0.50 |
| 322 | comparative | 18 | 0.55 |
| 323 | comparative | 20 | 0.50 |
| 324 | comparative | 18 | 0.55 |
| 325 | comparative | 16 | 0.60 |

As understood from Table 10, the samples Nos. 301 to 312 having matrices of copper, tin, nickel and aluminum were excellent in judder resistance with counterpart attack quantities of not more than 10 μm and exhibited small abrasion loss values of the friction materials.

On the other hand, the samples Nos. 313 to 325, similarly having matrices of copper, tin, nickel and aluminum, were insufficient as friction materials as described below:

The sample No. 313 containing orthoclase in a ratio smaller than those of the remaining samples was insufficient in judder resistance. The sample No. 314 containing orthoclase in a high ratio was inhibited from sintering of the matrix and reduced in material strength, and exhibited high abrasion loss.

The sample No. 315 containing graphite in a ratio smaller than those of the remaining samples exhibited high abrasion loss. The sample No. 316 containing graphite in a high ratio was remarkably reduced in material strength and increased in abrasion loss.

The sample No. 317 containing potassium titanate in a ratio smaller than those of the remaining samples was reduced in material strength and increased in abrasion loss.

The sample No. 318 containing potassium titanate in a ratio larger than those of the remaining samples was reduced in material strength and increased in abrasion loss.

The sample No. 319 containing orthoclase in a grain size smaller than those of the remaining samples was inhibited from sintering of the matrix and reduced in material strength, and exhibited high abrasion loss. The sample No. 320 containing orthoclase in a grain size larger than those of the remaining samples was insufficiently improved in judder resistance.

The sample No. 321 containing graphite in a grain size smaller than those of the remaining samples was inhibited from sintering of the matrix, reduced in material strength and deteriorated in abrasion resistance. The sample No. 322 containing graphite in a grain size larger than those of the remaining samples was incapable of ensuring a homogeneous dispersed state due to remarkable segregation of graphite, reduced in material strength and increased in abrasion loss.

The samples Nos. 323 to 325 of conventional sintered friction materials containing no potassium titanate were reduced in material strength and increased in abrasion loss due to the absence of potassium titanate.

(TEST EXAMPLE 5)

Mixed powder materials were prepared by blending matrices, magnesium oxide, graphite and potassium titanate in the ratios shown in Table 11, molded into green compacts under a pressure of 2 to 5 tons/cm$^2$ and thereafter sintered in an N$_2$ atmosphere at 750° C. for 20 to 90 minutes, thereby preparing samples Nos. 401 to 425 of sintered friction materials.

TABLE 11

| | | Matrix | | | | | Magnesium Oxide | | Graphite | | Potassium Titanate | | | |
|---|---|---|---|---|---|---|---|---|---|---|---|---|---|---|
| Sample No. | Classification | Cu | Sn | Ni | Al | Total Ratio (Vol. %) | Ratio (Vol. %) | Grain Size (μm) | Ratio (Vol. %) | Grain Size (μm) | Whiskery | Platy | Spherical | Total Ratio (Vol. %) |
| 401 | inventive | 23 | 3 | 10 | 2 | 38 | 12 | 0.5~180 | 30 | 200~600 | 0 | 0 | 20 | 20 |
| 402 | inventive | 23 | 3 | 10 | 2 | 38 | 4 | 0.5~180 | 45 | 200~600 | 0 | 0 | 13 | 13 |
| 403 | inventive | 23 | 3 | 10 | 2 | 38 | 8 | 0.5~180 | 26 | 200~600 | 0 | 0 | 28 | 28 |
| 404 | inventive | 23 | 3 | 10 | 2 | 38 | 13 | 0.5~180 | 21 | 200~600 | 0 | 0 | 28 | 28 |
| 405 | inventive | 26 | 3.4 | 11.3 | 2.3 | 43 | 13 | 0.5~180 | 16 | 200~600 | 0 | 0 | 28 | 28 |
| 406 | inventive | 24.8 | 3.2 | 10.8 | 2.2 | 41 | 13 | 0.5~180 | 41 | 200~600 | 0 | 0 | 5 | 5 |
| 407 | inventive | 24.8 | 3.2 | 10.8 | 2.2 | 41 | 13 | 0.5~180 | 31 | 200~600 | 0 | 0 | 15 | 15 |
| 408 | inventive | 23 | 3 | 10 | 2 | 38 | 8 | 0.5~180 | 40 | 200~600 | 0 | 0 | 14 | 14 |
| 409 | inventive | 23 | 3 | 10 | 2 | 38 | 8 | 0.5~180 | 40 | 200~600 | 0 | 14 | 0 | 14 |
| 410 | inventive | 23 | 3 | 10 | 2 | 38 | 8 | 0.5~180 | 40 | 200~600 | 14 | 0 | 0 | 14 |
| 411 | inventive | 23 | 3 | 10 | 2 | 38 | 8 | 0.5~180 | 40 | 200~600 | 0 | 7 | 7 | 14 |
| 412 | inventive | 23 | 3 | 10 | 2 | 38 | 8 | 0.5~180 | 40 | 200~600 | 7 | 0 | 7 | 14 |
| 413 | comparative | 23 | 3 | 10 | 2 | 38 | 0.5 | 0.5~180 | 43 | 200~600 | 0 | 0 | 18.5 | 18.5 |
| 414 | comparative | 23 | 3 | 10 | 2 | 38 | 18 | 0.5~180 | 33 | 200~600 | 0 | 0 | 11 | 11 |
| 415 | comparative | 33.3 | 4.3 | 14.5 | 2.9 | 55 | 15 | 0.5~180 | 5 | 200~600 | 0 | 0 | 25 | 25 |
| 416 | comparative | 22.4 | 2.9 | 9.7 | 2.0 | 37 | 2 | 0.5~180 | 55 | 200~600 | 0 | 0 | 6 | 6 |
| 417 | comparative | 23 | 3 | 10 | 2 | 38 | 15 | 0.5~180 | 44 | 200~600 | 0 | 0 | 3 | 3 |
| 418 | comparative | 23 | 3 | 10 | 2 | 38 | 5 | 0.5~180 | 25 | 200~600 | 0 | 0 | 32 | 32 |
| 419 | comparative | 23 | 3 | 10 | 2 | 38 | 8 | 0.01~0.4 | 40 | 200~600 | 0 | 0 | 14 | 14 |
| 420 | comparative | 23 | 3 | 10 | 2 | 38 | 8 | 220~400 | 40 | 200~600 | 0 | 0 | 14 | 14 |
| 421 | comparative | 23 | 3 | 10 | 2 | 38 | 8 | 0.5~180 | 40 | 0.1~8 | 0 | 0 | 14 | 14 |
| 422 | comparative | 23 | 3 | 10 | 2 | 38 | 8 | 0.5~180 | 40 | 1200~2000 | 0 | 0 | 14 | 14 |
| 423 | comparative | 27 | 4 | 12 | 3 | 46 | 14 | 0.5~180 | 40 | 200~600 | 0 | 0 | 0 | 0 |
| 424 | comparative | 26 | 3.4 | 11.3 | 2.3 | 43 | 14 | 0.5~180 | 43 | 200~600 | 0 | 0 | 0 | 0 |
| 425 | comparative | 24.8 | 3.2 | 10.8 | 2.2 | 41 | 14 | 0.5~180 | 45 | 200~600 | 0 | 0 | 0 | 0 |

A creak test was carried out on the samples in accordance with the JASO C406-82 passenger car braking device dynamometer test method. Table 12 shows the test conditions. Abrasion loss values were measured before and after the creak test. Table 13 shows the ranges of friction coefficients, creak ratios (number of creaking times÷total number of braking times) and abrasion loss values in the creak test. Referring to Tables 11 and 13, the samples Nos. 401 to 412 are inventive samples, and the samples Nos. 413 to 425 are comparative samples. In the columns of "Classification", "inventive" and "comparative" indicate the inventive and comparative samples respectively.

TABLE 12

| | |
|---|---|
| Car Speed (km/h) | 30 |
| Braking Start Temperature (°C.) | 50→80→120→160→200→160→120→80→50 |
| Brake Fluid Pressure (kgf/cm$^2$) | 5→10→15→20 |
| Number of Cycles | 4 cycles of above combination |
| Total Number of Braking Times | 144 |

TABLE 13

| Sample No. | Classification | Friction Coefficient | Abrasion Loss of Friction Material (mm) | Creak Ratio |
| --- | --- | --- | --- | --- |
| 401 | inventive | 0.47~0.54 | 0.12 | not more than 1% |
| 402 | inventive | 0.44~0.50 | 0.09 | not more than 1% |
| 403 | inventive | 0.46~0.53 | 0.13 | not more than 1% |
| 404 | inventive | 0.48~0.55 | 0.14 | not more than 1% |
| 405 | inventive | 0.48~0.55 | 0.15 | not more than 1% |
| 406 | inventive | 0.48~0.53 | 0.10 | not more than 1% |
| 407 | inventive | 0.48~0.53 | 0.12 | not more than 1% |
| 408 | inventive | 0.46~0.51 | 0.10 | not more than 1% |
| 409 | inventive | 0.46~0.51 | 0.10 | not more than 1% |
| 410 | inventive | 0.46~0.51 | 0.10 | not more than 1% |
| 411 | inventive | 0.46~0.51 | 0.10 | not more than 1% |
| 412 | inventive | 0.46~0.51 | 0.10 | not more than 1% |
| 413 | comparative | 0.35~0.42 | 0.19 | 30% |
| 414 | comparative | 0.45~0.53 | 0.62 | not more than 1% |
| 415 | comparative | 0.40~0.47 | 1.10 | 10% |
| 416 | comparative | 0.30~0.40 | 0.95 | 5% |
| 417 | comparative | 0.45~0.50 | 0.50 | 5% |
| 418 | comparative | 0.46~0.52 | 0.81 | 4% |
| 419 | comparative | 0.33~0.40 | 0.65 | not more than 1% |
| 420 | comparative | 0.45~0.56 | 0.19 | 21% |
| 421 | comparative | 0.44~0.52 | 0.50 | 2% |
| 422 | comparative | 0.33~0.55 | 0.55 | 6% |
| 423 | comparative | 0.48~0.56 | 0.70 | 10% |
| 424 | comparative | 0.48~0.55 | 0.65 | 6% |
| 425 | comparative | 0.48~0.53 | 0.60 | 5% |

As understood from Table 13, the samples Nos. 401 to 412 having matrices of copper, tin, nickel and aluminum exhibited high friction coefficients and small abrasion loss. It is also understood that the samples Nos. 401 to 412 had sufficient creak resistance for serving as friction materials with creak ratios of not more than 1%.

On the other hand, the samples Nos. 413 to 425, similarly having matrices of copper, tin, nickel and aluminum, were insufficient as friction materials as described below:

The sample No. 413 containing magnesium oxide in a ratio smaller than those of the remaining samples was insufficiently improved in creak resistance. The sample No. 414 containing magnesium oxide in a high ratio was inhibited from sintering of the matrix, reduced in material strength and increased in abrasion loss.

The sample No. 415 containing graphite in a ratio smaller than those of the remaining samples exhibited high abrasion loss. The sample No. 416 containing graphite in a high ratio was remarkably reduced in material strength and increased in abrasion loss.

The sample No. 417 containing potassium titanate in a ratio smaller than those of the remaining samples was reduced in material strength and increased in abrasion loss. The sample No.418 containing potassium titanate in a ratio larger than those of the remaining samples was reduced in material strength and increased in abrasion loss.

The sample No. 419 containing magnesium oxide in a grain size smaller than those of the remaining samples was inhibited from sintering of the matrix, reduced in material strength and increased in abrasion loss. The sample No. 420 containing magnesium oxide in a grain size larger than those of the remaining samples was insufficiently improved in creak resistance.

The sample No. 421 containing graphite in a grain size smaller than those of the remaining samples was inhibited from sintering of the matrix, reduced in material strength and deteriorated in abrasion resistance. The sample No. 422 containing graphite in a grain size larger than those of the remaining samples was incapable of ensuring a homogeneous dispersed state due to remarkable segregation of graphite, reduced in material strength and increased in abrasion loss.

The samples Nos. 423 to 425 of conventional sintered friction materials containing no potassium titanate were reduced in material strength and exhibited remarkable abrasion loss due to the absence of potassium titanate.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sintered friction material comprising:
   a matrix of a copper-system metal;
   from 1 to 15 vol. % of a specific additive consisting of at least one of zirconium oxide, zircon, silica, dolomite, orthoclase, and magnesium oxide;
   from 10 to 50 vol. % of graphite; and
   from 5 to 30 vol. % of potassium titanate in at least one of a plate-like form and a spherical form.

2. The sintered friction material according to claim 1, wherein said copper-system metal comprises copper and tin.

3. The sintered friction material according to claim 2, wherein said copper-system metal further comprises nickel.

4. The sintered friction material according to claim 3, wherein said copper-system metal further comprises aluminum, and wherein a content of said copper predominates over a combined content of said tin, said nickel and said aluminum.

5. The sintered friction material according to claim 1, wherein said specific additive consists of said zirconium oxide.

6. The sintered friction material according to claim 1, wherein said specific additive consists of said silica.

7. The sintered friction material according to claim 1, wherein said specific additive consists of said dolomite.

8. The sintered friction material according to claim 1, wherein said specific additive consists of said orthoclase.

9. The sintered friction material according to claim 1, wherein said specific additive consists of said magnesium oxide.

10. The sintered friction material according to claim 1, wherein said potassium titanate comprises potassium titanate in said spherical form.

11. The sintered friction material according to claim 10, excluding a whiskery form of potassium titanate.

12. The sintered friction material according to claim 11, excluding a plate-like form of potassium titanate.

13. The sintered friction material according to claim 1, wherein said potassium titanate comprises potassium titanate in said plate-like form.

14. The sintered friction material according to claim 1, excluding a whiskery form of potassium titanate.

15. The sintered friction material according to claim 1, wherein said potassium titanate has a composition represented by the formula $K_2O \cdot n(TiO_2)$ wherein n is 2, 4, 6 or 8.

16. The sintered friction material according to claim 1, wherein said specific additive has a grain size in a range from 0.5 to 200 $\mu$m and said graphite has a grain size in a range from 10 to 1000 $\mu$m.

17. The sintered friction material according to claim 1, consisting of from 4 to 13 vol. % of said specific additive, from 20 to 40 vol. % of said graphite, from 13 to 20 vol. % of said potassium titanate, and a remainder of said matrix.

18. The sintered friction material according to claim 1, consisting of from 2 to 14 vol. % of said specific additive, from 15 to 45 vol. % of said graphite, from 5 to 28 vol. % of said potassium titanate, and a remainder of said matrix.

19. The sintered friction material according to claim 18, wherein said copper-system metal comprises copper, tin, nickel and aluminum, said potassium titanate comprises potassium titanate in spherical form and excludes a whiskery form of potassium titanate, said specific additive has a grain size in a range from 0.5 to 200$\mu$m, and said graphite has a grain size in a range from 10 to 1000$\mu$m.

20. The sintered friction material according to claim 1, wherein said copper-system metal comprises copper, tin, nickel and aluminum, said potassium titanate comprises potassium titanate in spherical form and excludes a whiskery form and a plate-like form of potassium titanate, said specific additive has a grain size in a range from 0.5 to 200$\mu$m, and said graphite has a grain size in a range from 10 to 1000$\mu$m.

* * * * *

UNITED STATES PATENT AND TRADEMARK OFFICE
CERTIFICATE OF CORRECTION

PATENT NO. : 6,004,370  
DATED : December 21, 1999  
INVENTOR(S) : Takatoshi Takemoto, et al Page 1 of 3

It is certified that error appears in the above-identified patent and that said Letters Patent is hereby corrected as shown below:

On the Title Page
Under References Cited, U.S. PATENT DOCUMENTS, insert
--3,114,197  12/1963 Du Bois et al.--;
--3,191,278  6/1965 Kendall et al.--;
--3,795,493  3/1974 Mertl et al.--;
--4,871,394  10/1989 Baker et al.--;
--5,004,497  4/1991 Shibata et al.--;
--5,308,392  5/1994 Morita et al.--;
--5,383,963  1/1995 Kobayashi et al--;
--5,411,773  5/1995 Ohya et al.--;
--5,563,199  10/1996 Harada et al.--;
--5,841,042  11/1998 Kato--;

Under References Cited, FOREIGN PATENT DOCUMENTS, insert
--61-67737   4/1986 Japan--;
--63-190128  8/1988 Japan--;
--08-337660  12/1996 Japan--;

Under References Cited, insert
--OTHER DOCUMENTS--;
--"FILLER UTILIZING DICTIONARY", published by Taiseisha, pgs, 129-135--;

UNITED STATES PATENT AND TRADEMARK OFFICE
CERTIFICATE OF CORRECTION

PATENT NO. : 6,004,370
DATED : December 21, 1999
INVENTOR(S) : Takatoshi Takemoto, et al It is certified that error appears in the above-identified patent and that said Letters Patent is hereby corrected as shown below:

Col. 1 line 32, before "degree" replace "larger" by --lesser--;
      line 39, before "degree" replace "larger" by --lesser--;

Col. 2 line 22, after "high" replace "hot" by --heat--;
      line 23, after "disperse" replace "heat" by --hot--;

Col. 5 line 37, after "was" replace "made" by --carried out--;

Col. 12 line 2, after "was" replace "made" by --carried out--;
      Table 6, replace Table by

TABLE 6

| | |
|---|---|
| Dimensions of Test Piece (mm) | 7 (width) by 5 (thickness) by 30 (length) |
| Distance between Support Points (mm) | 20 |
| Load System | three-point bending |
| Crosshead Speed (mm/min.) | 0.5 |

Col. 14
    line 49, before "powder" replace "Mxed" by --Mixed--;

UNITED STATES PATENT AND TRADEMARK OFFICE
CERTIFICATE OF CORRECTION

PATENT NO. : 6,004,370
DATED : December 21, 1999
INVENTOR(S) : Takatoshi Takemoto, et al It is certified that error appears in the above-identified patent and that said Letters Patent is hereby corrected as shown below:

Col. 15  Table 9, replace Table by

TABLE 9

| | |
|---|---|
| Shape of Friction Surface (mm) | 10 x 20 |
| Counterpart | FC 200 |
| Peripheral Speed (m/s) | 10 |
| Surface Pressure (kgf/cm$^2$) | 1 |
| Friction Time (hr) | 24 |
| Effective Radius of Friction (m) | 0.1 |

Signed and Sealed this

Twenty-sixth Day of September, 2000

Attest:

Q. TODD DICKINSON

*Attesting Officer*     *Director of Patents and Trademarks*